United States Patent
Muzzi et al.

(10) Patent No.: US 6,204,472 B1
(45) Date of Patent: Mar. 20, 2001

(54) METHOD AND DEVICE FOR CUTTING HOLLOW GLASS ARTICLES BY A LASER BEAM

(75) Inventors: Alessio Muzzi; Claudio Cipriani, both of Colle Val D'Elsa; Dario Gusti, Milan, all of (IT)

(73) Assignee: CALP-Cristalleria Artistica La Piana S.p.A. (IT)

( * ) Notice: Subject to any disclaimer, the term of this patent is extended or adjusted under 35 U.S.C. 154(b) by 0 days.

(21) Appl. No.: 09/202,398
(22) PCT Filed: Oct. 18, 1996
(86) PCT No.: PCT/EP96/04528
§ 371 Date: Dec. 14, 1998
§ 102(e) Date: Dec. 14, 1998
(87) PCT Pub. No.: WO98/00266
PCT Pub. Date: Jan. 8, 1998

(30) Foreign Application Priority Data

Jun. 27, 1996 (IT) .............................. MI96A1316

(51) Int. Cl.$^7$ ............................ B23K 26/00; B23K 26/14
(52) U.S. Cl. .................. 219/121.67; 219/121.84
(58) Field of Search ................ 219/121.67, 121.68, 219/121.69, 121.72, 121.73, 121.82, 121.84, 121.85; 264/400; 65/112, 113

(56) References Cited

U.S. PATENT DOCUMENTS

| | | | | |
|---|---|---|---|---|
| 3,453,097 | * | 7/1969 | Hafner | 65/112 |
| 3,839,005 | * | 10/1974 | Meyer | 65/112 |
| 4,467,168 | * | 8/1984 | Morgan et al. | 219/121.67 |
| 4,549,066 | * | 10/1985 | Piccioli et al. | 219/121.67 |
| 4,682,003 | * | 7/1987 | Minakawa et al. | 219/121.72 |
| 5,622,540 | * | 4/1997 | Stevens | 65/112 |

FOREIGN PATENT DOCUMENTS

| | | | |
|---|---|---|---|
| 4305107 | * | 8/1994 | (DE). |
| 4411037 | * | 10/1994 | (DE). |
| 1292981 | * | 10/1972 | (GB). |

* cited by examiner

Primary Examiner—Samuel M. Heinrich
(74) Attorney, Agent, or Firm—Steinnberg & Raskin, P.C.

(57) ABSTRACT

A method and device for cutting hollow glass articles (1) by laser, comprising a first stage in which an incision is made along the circumferential cutting line in the articles, which are rotating about their axis. The article is rotated about its axis. The incision is made by a focused laser beam (3). The article, simultaneously with the incision, is blasted in correpondence with the irradiated point by a pressurized jet of a fluid for cooling and cleaning the incision channel.

15 Claims, 1 Drawing Sheet

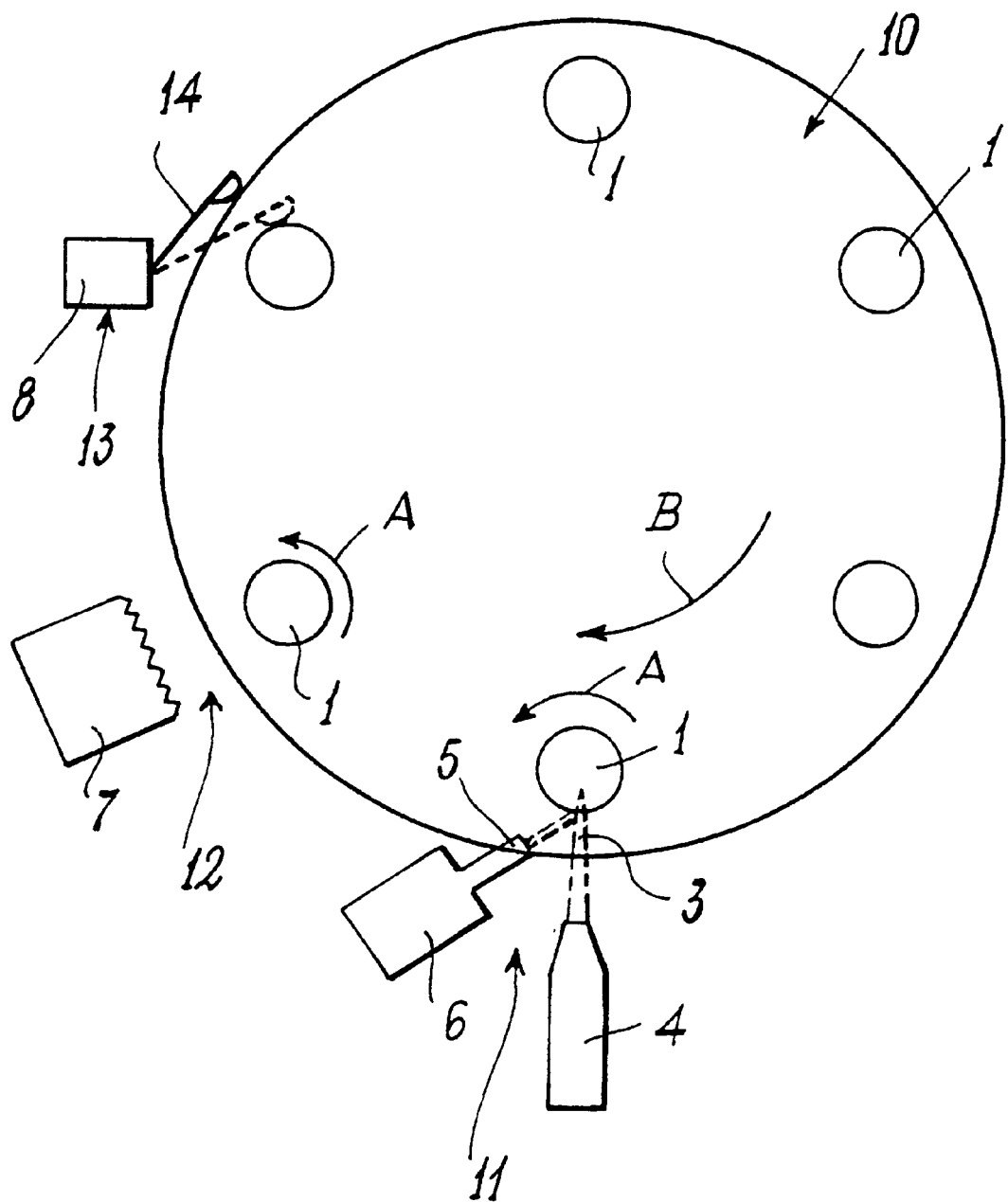

METHOD AND DEVICE FOR CUTTING HOLLOW GLASS ARTICLES BY A LASER BEAM

This invention relates to a method and device for the laser-beam cutting of hollow glass articles, for example the blowing cap of blow-moulded articles such as tumblers, in accordance with the pre-characterising part of the independent claims.

In cutting methods similar to the aforesaid type, the incision is made by mechanical devices carrying grinding wheels, points or similar cutting members. With the known methods and devices of the aforesaid type, an incision of constant depth along the entire circumferential cutting line is not always obtained.

Non-uniform incision of the articles sometimes makes it impossible to cut the article by "temperature change" during the next heating stage, and at other times results in an extremely irregular cut.

Hence the article must often be either rejected or undergo costly and lengthy smoothing.

Other cutting methods and devices are also known in which a laser is used for cutting. For example, DE-OS-3546001 describes a method in which the glass region to be cut is firstly maintained at a high temperature, slightly below the softening point, after which this region is exposed several times along the division line to a laser beam, while a traction force simultaneously acts on that part of the article to be removed. This method is relatively complicated and difficult to implement, mainly for the fact that the force of gravity is generally used as the traction force, this resulting in the need to suitably position the glass to be cut. The cutting line is not sharp and precise, in that the glass is substantially cut by the effect of the laser irradiation.

U.S. Pat. No. 4,467,168 describes a method for cutting glass plates in which a laser is used to make an incision in the glass along the desired cutting line while simultaneously heating said incision region above the glass softening point, after which a gas jet is directed onto the laser focusing region, this gas jet cooperating with the laser to create a fissure in the glass.

The aforedescribed method is claimed for cutting for example brittle plates, but not hollow articles. Moreover it should be noted that the cut in the glass is not obtained by virtue of the stresses generated in the glass but by evaporation-removal, by the combined action of the laser and gas jet, through the entire glass thickness along the incision line. The cut which would be obtained in this manner in the case of hollow glass articles would not be sufficiently sharp, and would require subsequent lengthy and costly machining.

Finally, WO 94/22778 describes a method for cutting hollow glass articles in which the article is rotated at a velocity of about 1 m/sec in correspondence with the cutting line and is heated with a laser such as to generate a region of stress at the required cutting line. In addition, a small crack is made in the article in correspondence with the cutting line. The article is then cooled along the entire circumferential cutting line. This method has proved extremely deficient in the case of glass of non-uniform thickness or of particular geometrical shapes, for example conical. In such a case, as there is not an incision line along the entire circumferential cutting line, the cut is often not sharp and satisfactory.

An object of the present invention is to provide a specific method and device for cutting hollow glass articles by a laser, which obviates the aforesaid drawbacks and in particular, for equal production rates compared with the known art, results in cuts of superior quality which minimize or eliminate subsequent lengthy and costly smoothing, even in the case of articles of non-uniform thickness or of particular geometrical shapes such as conical, elliptical or polygonal.

A further object is to provide a method and device which reduce the number of rejects.

These and further objects which will be apparent to an expert of the art are attained by a method and device in accordance with the characterising part of the accompanying main claims.

The present invention will be more apparent from the accompanying drawing provided by way of non-limiting example, which schematically represents a device for implementing the method of the invention seen from above.

The method of the invention comprises a first stage in which the hollow glass articles 1 are rotated (see the arrow indicated by A) such that those points lying on the circumferential line along which the cut is to be made have, for example, a velocity of about 1 m/sec. An incision is made on the rotating article along the entire circumferential cutting line, to a depth variable according to the thickness of the article but in any event less than 70% of said thickness. It should be noted that the article incision takes place by glass evaporation. For this purpose a laser beam 3 is used originating from a focused $CO_2$ laser 4 of power variable between 200 and 600 W and a wavelength of 10.6 micrometres.

The rotating glass article is irradiated for a number of revolutions depending on its thickness, so as to obtain the desired incision which simultaneously heating the glass along the cutting line.

It should be noted that the position of the laser and its focal length are chosen such that any thickness or geometrical shape variations in the glass article do not influence the incision. To achieve this, the focal point of the beam 3 can lie behind the incision surface in the direction of the beam. The laser beam can also be advantageously orientated such as to be as perpendicular as possible to the surface of the glass article to be cut.

Simultaneously with the laser irradiation, the glass article is blasted at the irradiation point with a concentrated jet of pressurized dry air emitted by a nozzle 5 of a conventional compressor 6.

The air jet removes the evaporation residues from the incision channel created by the laser and rapidly cools the incision line. In this manner, stresses are created in the article in correspondence with the incision line, which can already result in fracture of the residual glass thickness along the incision line and hence detachment of the part to be removed, or in the case of blow-moulded articles such as tumblers, of the blowing cap.

To ensure that the treated articles are cut along the incision line, concentrated heating is then applied to the incision, with the article rotating.

The articles are heated in correspondence with the incision line to a temperature around the critical temperature for the particular type of glass with which the treated article is made. The heating is applied for example by conventional burners 7.

As a further guarantee, a conventional percussion tool 8 is then used to cause final detachment of that part of tie glass article to be removed, if detachment has not already spontaneously taken place.

The accompanying figure schematically shows a device for implementing the aforedescribed method.

The device comprises a usual turntable 10, rotating for example in the direction indicated by the arrow B, and comprising six seats each arranged to house a hollow glass article 1, for example a tumbler, and to rotationally drive it about its longitudinal axis, as indicated by the arrow A.

The device comprises usual instruments for controlling the article drive means so as to be able to vary the rotational velocity of said articles according to their shape and/or thickness and/or type of glass with which they are made, between about 0.1 and 6 m/sec.

The turntable 10 is arranged to move the articles 1 to the various article working stations. The articles firstly arrive at an incision station 11 comprising the laser 4 and the compressor 6 for feeding the air jet. The compressor 6 and laser 4 are of usual type and are connected to conventional supports (not shown) enabling the angular direction of the beam and jet to be adjusted according to the article shape. After the incision station 11 there is provided a heating station 12, of conventional type to the expert of the art, comprising a burner 7, for example of hydrogen type. Next there is a percussion station 13, also of conventional type to the expert of the art, comprising the percussion member 8 which, for example, is of the type comprising a movable arm 14 which can be brought into contact with that part of the glass article to be removed, and in particular with the blowing cap in the case of tumblers.

After the station 13 there are provided further usual stations (not shown) for finishing the cut edge.

It has been shown experimentally that with the method of the invention, extremely sharp and precise cuts can be obtained, requiring little subsequent rounding of the cut edge, the percentage of discards for cuts incorrectly made being extremely small, and certainly less than that of known methods.

Finally it should be noted that the aforedescribed embodiments of the method and device are provided by way of non-limiting example, numerous modifications being possible all falling within the same inventive concept, for example instead of the cooling air jet for the incision line, a jet of another cooling fluid, for example a gas or atomized water, could be used.

What is claimed is:

1. A method for cutting a hollow glass article using a laser, comprising the steps of:
   rotating the article about an axis;
   forming an incision channel by vaporizing said article along a circumferential cutting line of the glass article by a laser irradiating the circumferential cutting line; and
   simultaneously with forming the incision channel, cooling and cleaning the incision channel using a pressurized jet of fluid.

2. A method as claimed in claim 1, characterised in that the article to be treated is rotated about its axis such that points on the incision channel have a velocity of between 0.1 and 6 m/sec.

3. A method as claimed in claim 2, characterised in that points on the incision channel have a velocity of at least 1 m/sec.

4. A method as claimed in claim 1, characterised in that the incision channel a depth less than 70% of the glass thickness.

5. A method as claimed in claim 1, characterised in that the laser beam focal point lies behind the incision surface.

6. A method as claimed in claim 1, characterised in that the incision channel is formed in the glass article by orienting the laser beam substantially perpendicular to the surface of the glass article.

7. A method as claimed in claim 1, wherein the hollow glass article is a blow-moulded article having a blowing cap and wherein the method is characterised by being used for removing the blowing cap of the blow-moulded articles.

8. A method for cutting a hollow glass article using a laser, comprising the steps of:
   rotating the article about an axis;
   forming an incision channel around the circumference of the glass article by a laser beam of the laser;
   simultaneously with forming the incision channel, cooling and cleaning the incision channel using a pressurized jet of fluid;
   heating the glass article; and
   striking the glass article to cut the glass article along the incision channel if this has not already occurred.

9. A device for cutting hollow glass articles, comprising:
   means for rotating the articles about their axis;
   glass evaporation means for making an incision channel in the article corresponding to a circumferential cutting line, wherein the glass evaporation means is a laser and makes the incision channel along the entire circumferential cutting line by using said laser to irradiate vaporize the circumferential cutting line as the article is rotated about its axis; and
   a member for simultaneously cooling and cleaning the incision channel as the circumferential channel is being irradiated.

10. A device as claimed in claim 9, characterised in that the cooling and cleaning member comprises means (6) for emitting a pressurized cooling fluid.

11. A device as claimed in claim 9, characterised by comprising a rotary turntable (10) arranged to transfer the articles from one working station to the next, there being provided at least one incision station comprising a laser (4) and a member (6) for cooling and cleaning the incision channel.

12. A device as claimed in claim 9, further comprising means for angularly adjusting the incision member (6) to enable the laser beam to be at least directed substantially perpendicular to the surface of the article in which the incision channel is to be made.

13. A device as claimed in claim 9, characterised by comprising, downstream of the glass evaporation, means (7) for heating at least that part of the article in correspondence with the incision channel, said means being followed by percussion means (8) for striking a part of the article to be removed.

14. A device as claimed in claim 9, characterised by comprising means for adjusting the rotational velocity of the article about its axis.

15. A device for cutting a hollow glass article, comprising:
   means for rotating the article about an axis;
   a laser for making a circumferential incision channel in the article;
   means for cooling and cleaning the incision channel;
   means for heating at least the part of the article which corresponds with the incision channel; and
   percussion means for striking the article such that it is cut along the incision channel.

* * * * *